Feb. 24, 1959  A. FOURNIER  2,874,676
MACHINE FOR DECORATING PLATES OR SIMILAR OBJECTS
Filed Nov. 19, 1956  7 Sheets-Sheet 4
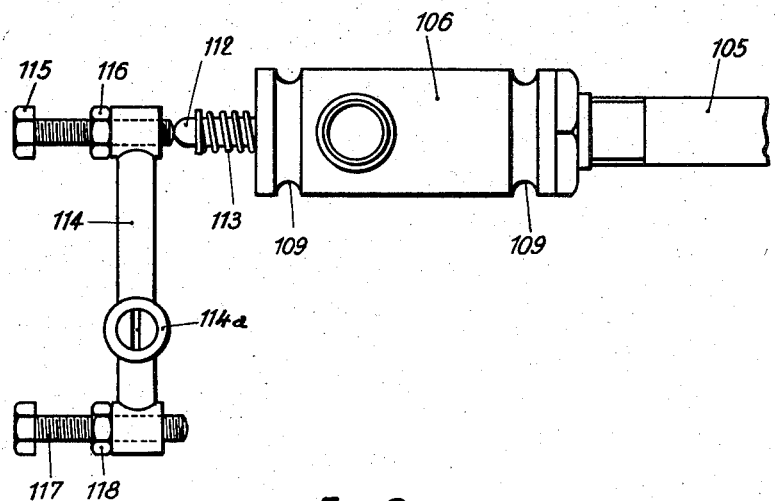
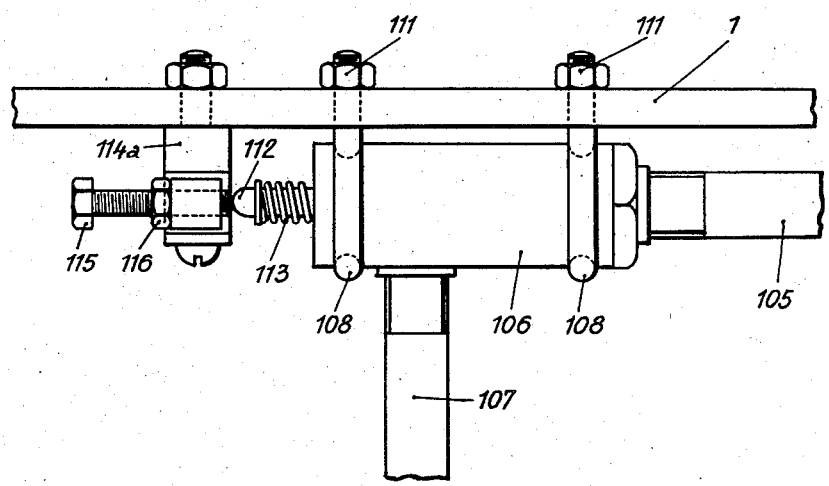
INVENTOR
ALBERT FOURNIER

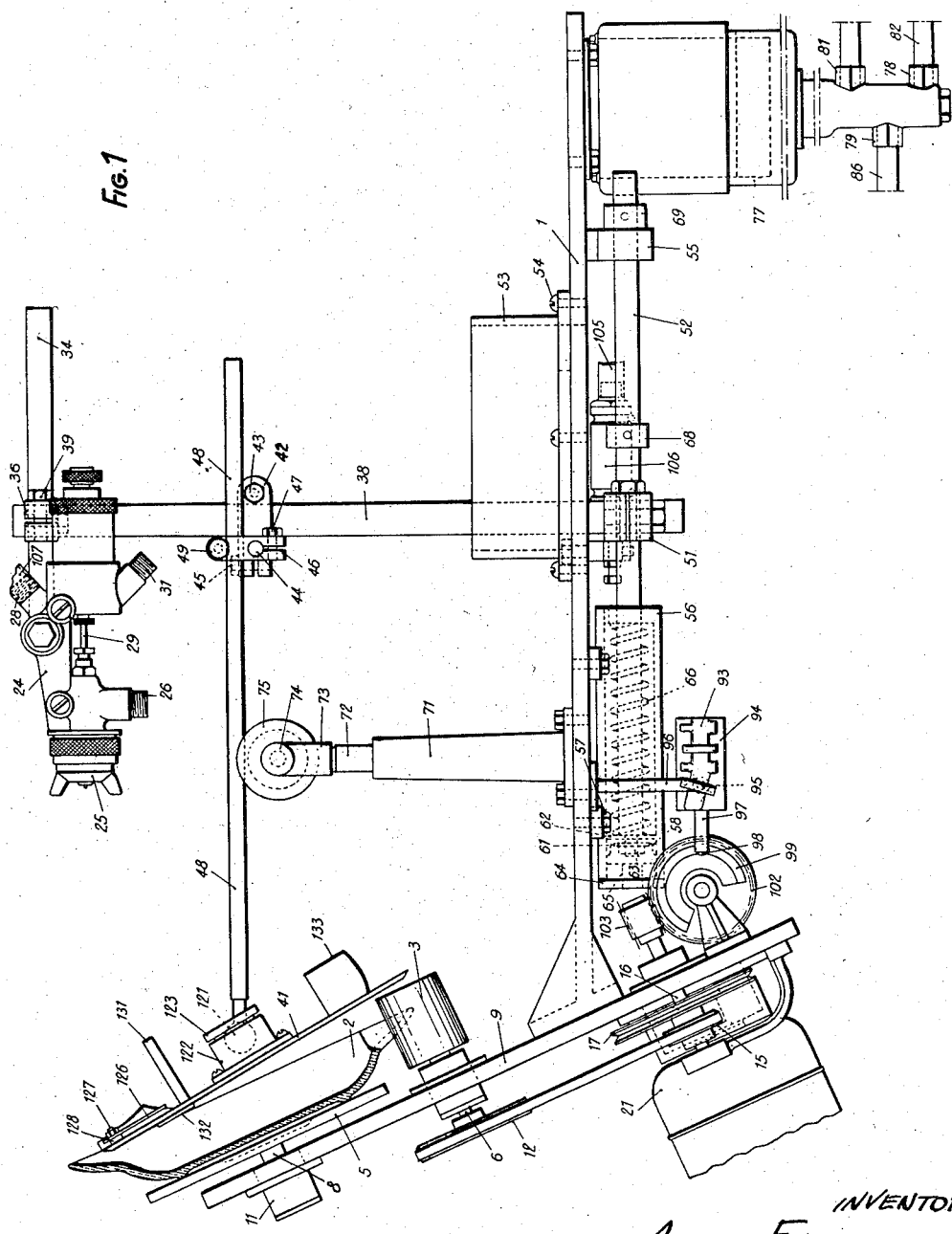

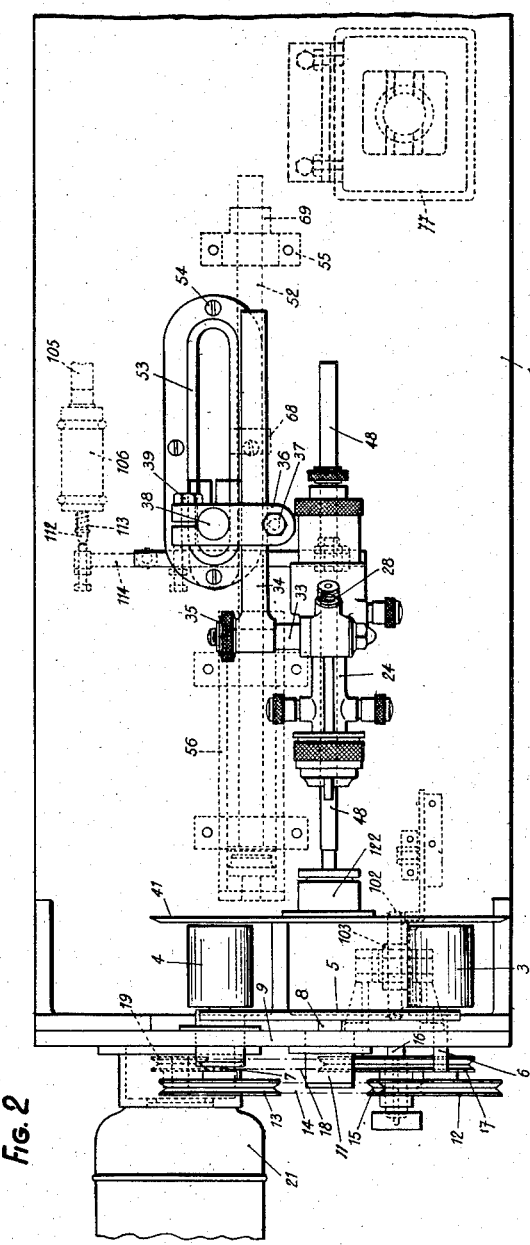

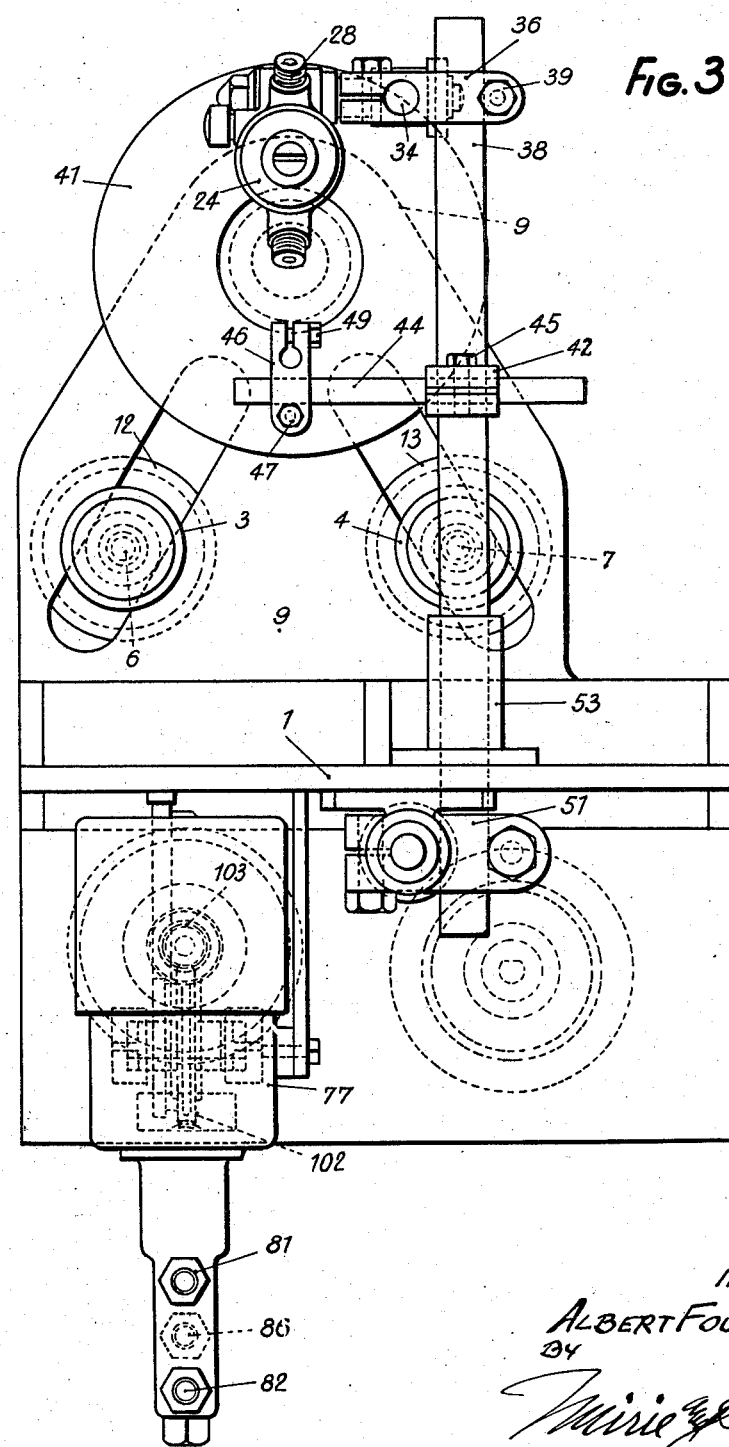

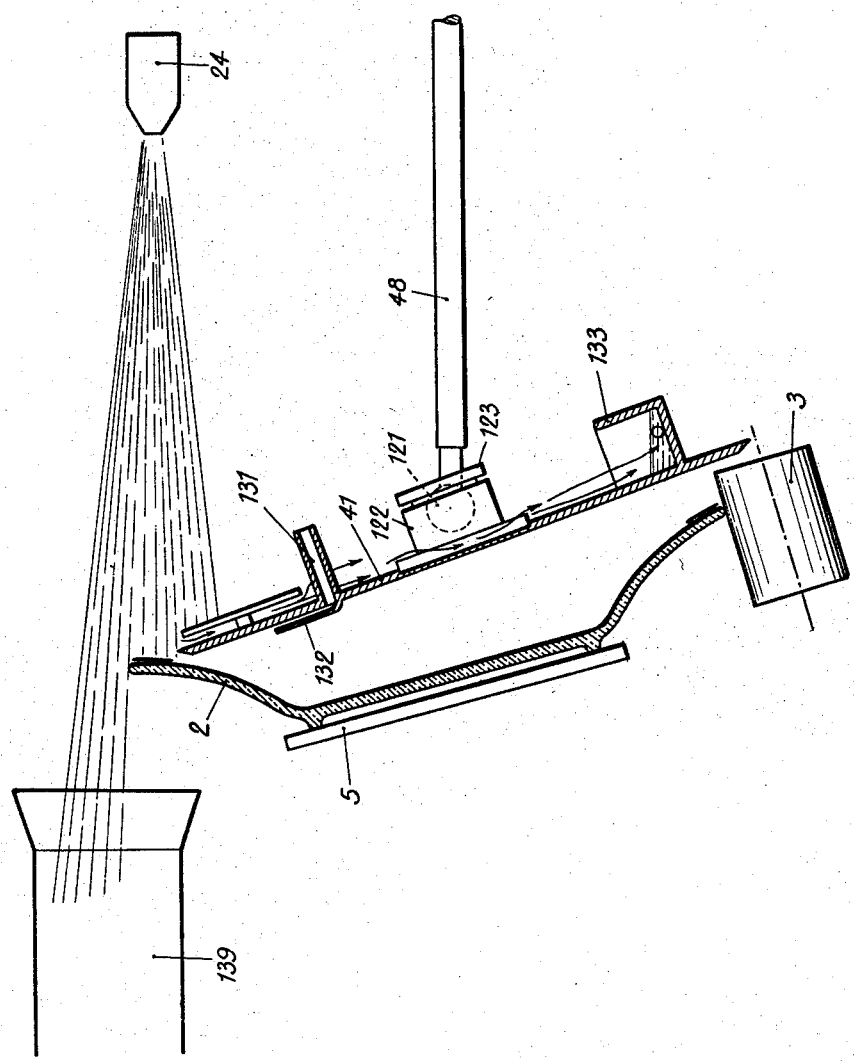

Feb. 24, 1959   A. FOURNIER   2,874,676
MACHINE FOR DECORATING PLATES OR SIMILAR OBJECTS
Filed Nov. 19, 1956   7 Sheets-Sheet 6
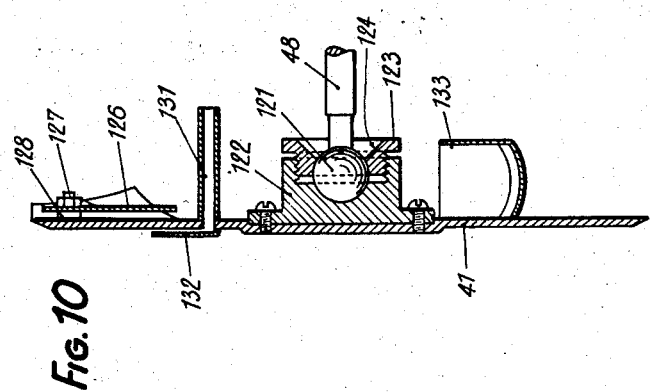
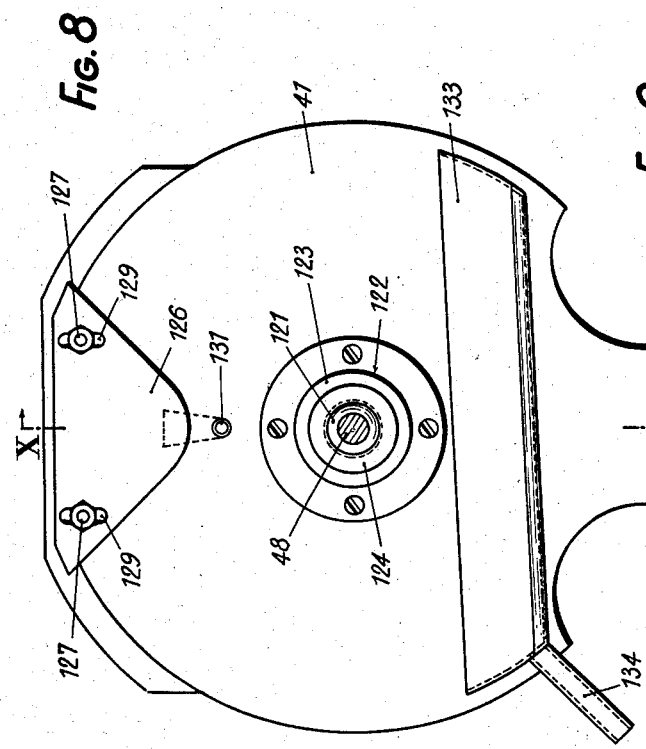
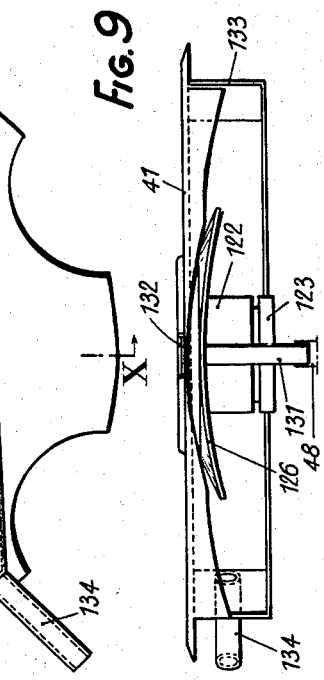
INVENTOR
ALBERT FOURNIER

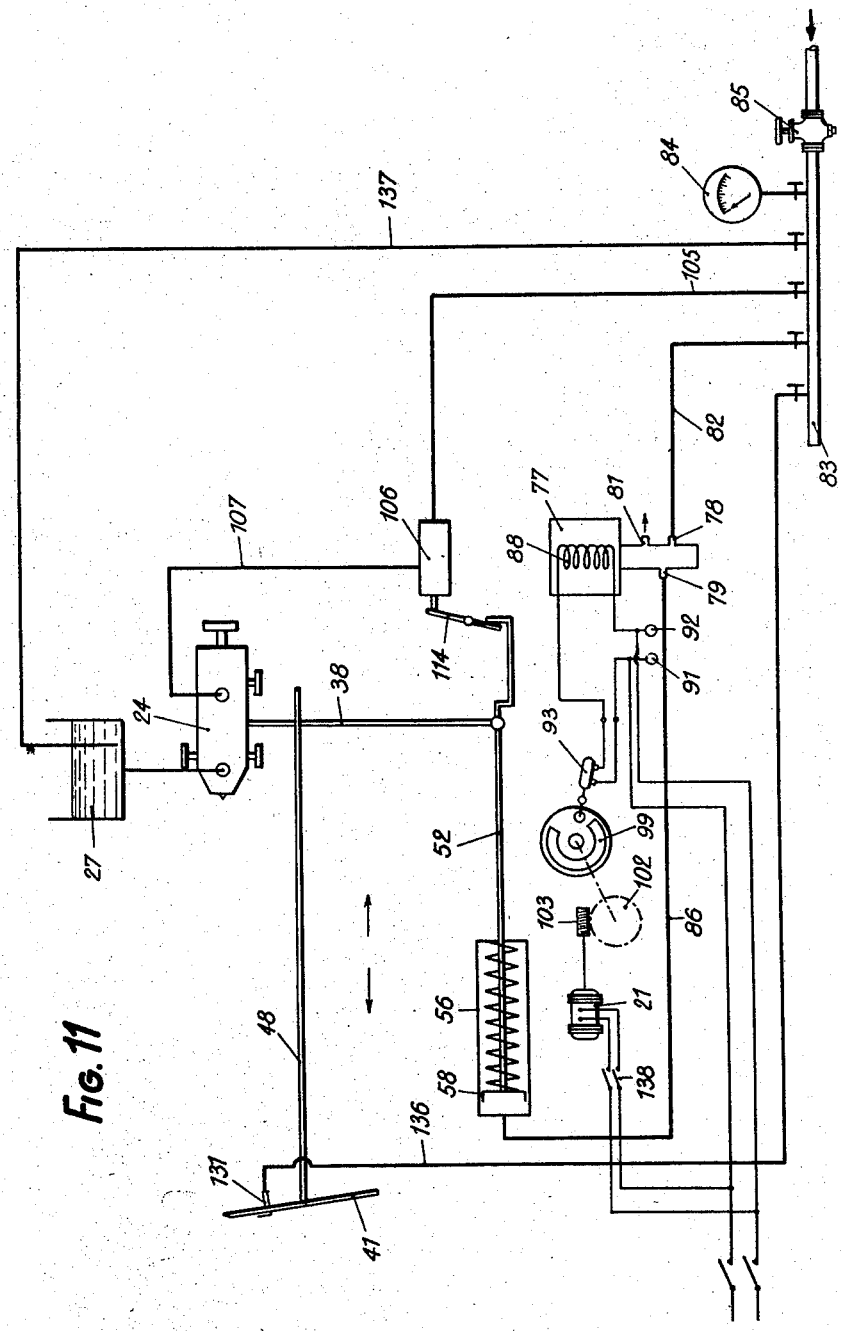

United States Patent Office

2,874,676
Patented Feb. 24, 1959

2,874,676

MACHINE FOR DECORATING PLATES OR SIMILAR OBJECTS

Albert Fournier, Saint-Amand-les-Eaux, France

Application November 19, 1956, Serial No. 622,991

12 Claims. (Cl. 118—301)

This invention relates to a machine for decorating plates of earthenware, pottery or chinaware or similar objects, and more particularly to a spraying apparatus for applying a liquid medium to work surfaces generally.

Hitherto such work was done by hand, so that output was relatively low and it was not always possible to obtain the desirable degree of regularity, whether in the same object, or between one object and another.

One of the chief drawbacks or difficulties in connection with the spraying of color or any other liquid medium onto a work surface of any kind is that the margin of the area sprayed is not sharp and clearly defined, but tends to be blurred. The area which is adequately coated with the liquid, which may be regarded therefore as a solid zone of color, pales off gradually and merges indefinitely into the unsprayed area. This obviously greatly restricts the use of spraying apparatus as a means of decorating workpieces or depositing color or other liquid mediums onto work surfaces generally.

An object of the invention is to provide a machine enabling the execution on the rim of a plate, dish or similar circular object of a band or fillet of any width and of any color desired, automatically and with perfect regularity.

Another object of the present invention is to provide means whereby in a spraying apparatus a clean sharply defined edge to the area sprayed on work pieces generally can be easily obtained.

A machine in accordance with the invention comprises, in combination, a device for supporting and rotating each object to be decorated; a spray gun for the color to be applied to the object directed towards said support; a stencil plate supported by a carrier arranged to be actuated in such a manner as to enable said stencil plate to be repeatedly approached nearly into contact with the object to be decorated, in the path of the spray from said spray gun, and withdrawn from the object thereby to permit the object to be removed and replaced by another; means for performing such motions of said stencil plate; and means for supplying compressed air to said spray gun when the stencil plate is in position proximate said object, said means being caused to act synchronously with the rotation of said object so that the latter performs at least one complete revolution during the time that the spray gun is in action and the stencil plate is in its working position.

Since it is sufficient to place an object in the machine during every return movement of the stencil plate for the purpose of automatically applying its decoration, a high output coupled with perfectly regular and accurate execution of the work is assured.

The device supporting and rotating the work piece may comprise a platen rotatable on an axis inclined to the horizontal, and two rotating rollers co-acting with the platen for supporting the rim of a plate or other circular object, the bottom of which rests on said platen.

Preferably the stencil plate is given a reciprocating motion, with dwells at both ends of each stroke, being movable horizontally in a vertical plane passing through the axis of the spray and the centre of the support for the objects to be decorated.

In accordance with a further feature of the invention the stencil plate carrier is attached to a piston working in a horizontal cylinder and periodically operated by a pressure fluid such as compressed air.

Admission of the pressure fluid into said cylinder may be controlled by an electrically-actuated valve governed by a moving cam driven at a uniform rate, preferably by the motor that drives the rollers on the platen supporting the work piece.

In accordance with a further feature of the invention the admission of compressed air to the spray is controlled by a normally closed valve which is held open by an element attached to the stencil plate while the latter is in the working position proximate the object to be decorated.

The stencil plate may be provided in its lower part with a trough intended to collect color that runs off the same, said trough being suitably associated with piping by which said color is returned to a recovery tank.

According to the present invention, the stencil plate which limits the area of the work surface exposed to the spray is provided with a mask between itself and the source of the spray, the edge of the mask being close to the edge of the plate across which the spray is directed, the mask serving to streamline the spray across the edge of the plate in such a way as to prevent the accumulation of globules of spray at the edge of the plate, which globules would be blown onto and foul the work surface.

According to still another feature of the invention the stencil plate is equipped on its rear face with a shield leaving a very narrow space between itself and the stencil plate into which compressed air is introduced to form an air screen in the plane of the stencil plate and across its surface on that face of it which is nearer the work surface, said air screen being in the form of a stream directed towards that part of the edge of the plate across which the spray is directed, so that the air stream impinges against the spray.

Preferably the spray gun is attached to the same support as the stencil plate.

The machine may usefully be equipped with an exhauster of any suitable type arranged to recover color not intercepted by the stencil plate or the object to be decorated.

The invention will be more readily appreciated from the following description and the accompanying drawings which show one form of embodiment merely by way of example and in which:

Fig. 1 is a side view in elevation of a machine according to the invention for decorating domestic crockery, pottery or porcelain (for the sake of simplicity, the foot or pedestal of the machine is not represented).

Figs. 2 and 3 are respectively a plan and an end view in elevation of the machine shown in Fig. 1.

Fig. 4 is a vertical section, on a larger scale, of the device controlling the displacements of the support of the stencil plate and spray gun.

Figs. 5 and 6 are respectively a plan and an elevation of the means for actuating the valve that controls the admission of compressed air to the spray gun.

Fig. 7 shows, in vertical section, the manner of action of the machine for painting objects and the recovery of unused coloring matter.

Fig. 8 is a front detail view of the stencil plate with its paint recovery attachment.

Fig. 9 is a plan corresponding to Fig. 8.

Fig. 10 is a vertical section in the plane X—X of Fig. 8.

Fig. 11 is a general diagram of the arrangement of the machine.

Referring now more particularly to the Figs. 1 to 3, the machine has a table 1 that rests on feet (not shown) and supports all the working and controlling parts.

An article to be decorated, for instance a plate 2, rests with its rim on two cylindrical rollers 3, 4, while its bottom is supported on an inclined platen 5. The two rollers 3, 4 and the platen 5 are respectively mounted on spindles 6, 7 and 8 which rotate in bearings, preferably of the ball-bearing type, fitted in an inclined plate 9 attached to the table 1 (in Figs. 2 and 3 this plate is assumed to be vertical to simplify representation, but it is shown in its inclined position in Fig. 1).

The platen 5 is mounted, freely rotatable, in a bearing 11, while the two rollers 3, 4 are respectively integral with two grooved pulleys 12, 13 connected by a driving belt 14, suitably of circular cross-section, to a driving pulley 15. This driving pulley is fixed on a shaft 16 which is freely rotatable in the plate 9 and carries another pulley 17, itself connected by a driving belt 18 to a pulley 19 mounted on the end of the power shaft of an electric motor 21. This motor pulley 19 is smaller than the pulley 17, and the pulley 15 is smaller than the pulleys 12, 13 fixed on the spindles 6, 7 carrying the two rollers 3, 4 thus constituting a speed-reducing gear between the motor and the rollers.

The two rollers 3, 4 are sheathed with rubber to ensure good contact with the rim of the article 2 to be decorated.

In the example shown, the plate 9 has been given an inclination of about 115 degrees but it is evidently possible to give it any other angle of inclination according to requirements.

The decoration of the article is effected by means of a compressed air spray gun or atomizer of any conventional type such as that indicated at 24 and incorporating a nozzle 25 for spraying the color, a color feed pipe 26 communicating with a suitable supply tank such as that shown at 27 in Fig. 11, and a compressed air supply pipe 28 for simultaneously controlling the opening of the atomizer needle 29 of the spray gun and the spraying of the color through the nozzle 25. In the drawing, the spray gun 24, which is of a known conventional type, is shown equipped with an additional compressed air feed pipe 31 which can be used when it is desired to have independent control of the spray gun atomizer needle. In the example herein described, this additional feed 31 is not employed.

The spray gun 24 is mounted on a horizontal shaft 33 (Fig. 2) threaded transversely through an eye at one end of a rod 34 on which it can be secured in any angular setting desired by means of a knurled nut 35 screw-threaded on to the correspondingly threaded end of said shaft 33.

The rod 34 passes through a split collar 36 in which it can be arranged to slide or to be held fast in any desired position by appropriate adjustment of a clamp screw 37. The split collar 36 is itself seated on a vertical main supporting pillar 38 and can be locked in any position thereon by a clamp screw 39.

The main supporting pillar 38 also carries a support 42 locked on the pillar 38 by a screw 43, a cross bar 44 locked with respect to this support by a screw 45, a second support 46 locked on the bar 44 by a screw 47, and finally a bar 48 held in the support 46 by means of a screw 49 and, in turn, supports a stencil plate 41.

It will be seen that the spray gun 24 and the stencil plate 41 can be fixed at any desired height on the vertical supporting pillar 38 and given any desired direction.

The supporting pillar 38 is arranged to be given a reciprocating motion horizontally in the direction of the work-carrying platen 5; its lower end is held clamped in a collar 51 secured on a horizontally slidable rod 52 under the machine table 1, the part of the pillar that projects through the table being held laterally by a guide 53 secured on the top of the table by screws 54.

The rod 52 (see also Fig. 4) is supported at one end in a plain bearing 55 attached to the under surface of the machine table 1 and at the other end in a working cylinder 56 also attached to the under surface of the machine table 1, by screws 57. The end of the rod 52 within the cylinder 56 is fitted with a piston formed by a sealing cup 58 held between two metal washers 61, 62 by means of a nut 63 screwed on the end of the rod. The cylinder 56 is closed by a cap 64 having a central hole 65 for the admission of compresesd air. A compression spring 66 interposed between the washer 62 and the opposite cylinder head forces the rod 52 to the left, as shown in Figs. 1 and 4. The stroke of the rod 52 is restricted, in both directions, by two adjustable ring stops 68, 69 on the said rod, which stops abut against the end faces of the plain bearing block 55.

The bar 48 carrying the stencil plate and thus movable axially is guided by means comprising a hollow supporting pedestal 71 attached to the top of the machine table, a spindle 72 slidably adjustable in height in said pedestal, a fork 73 at the upper end of the spindle through which a pin 74 is passed, and a grooved pulley wheel 75 preferably rotatable in ball bearings carried by the pin.

Compressed air is admitted into the cylinder 56 by means of an electrically controlled valve 77 (see also Fig. 11) attached to the under surface of the machine table 1. This electric valve 77, which is of conventional type, incorporates a compressed air inlet 78, a compressed air exhaust 79, and a blow off branch 81. The inlet 78 communicates by a pipe 82 with a compressed air distributor 83, suitably fitted in the foot or bedplate of the machine and equipped with a pressure gauge 84. The distributor 83 is supplied through a cock 85 from any convenient source of compressed air at the required pressure. The exhaust 79 from the electric valve is connected by a pipe 86 with the port 65 of the working cylinder 56, and the blow off branch 81 blows off into the atmosphere.

The electric valve 77 has a winding 88 supplied from a suitable current source at an appropriate voltage, connected to two terminals 91, 92 in a circuit incorporating a mercury tripping switch 93 which is actuated from the electric motor 21 through the intermediary of a device now to be described.

The mercury switch 93 (Fig. 1) is attached to a small plate 94 pivoting horizontally on a pivot 95 carried by a lug 96 fixed on the under surface of the machine table 1. The small plate 94 is equipped with a pin 97 having at its end a ball 98 engaging a circular cam track 99 having a gap that extends, in the example shown, over nearly a quarter of its circumference. The cam track 99 is integral with a worm wheel 102 meshing with a worm 103 fitted on the end of the pulley shaft 16.

The arrangement is such that when the ball 98 drops into the gap in the cam track the mercury switch 93 trips and closes the circuit feeding the winding 88 on the electric valve 77, while when the cam track forces back the ball, it causes the lifting of the switch and the breaking of the circuit. This circuit is consequently closed only during a fraction of each revolution of the cam 99.

The compressed air is fed to the inlet 28 of the spray gun 24 from the distributor 83 through a pipe 105, an admission valve 106 and a pipe 107 (Fig. 11). The admission valve 106 is attached to the under surface of the machine table 1 by two clips 108 (Figs. 5 and 6) seated in annular grooves 109 on the body of the valve and passing through corresponding holes in the table. Nuts 111 on the threaded ends of these clips hold the assembly in place. The movable internal element of the valve 106 is controlled by a pushrod 112 which passes outside the valve body and is pressed (towards the left in Fig. 6) into the closed position by a compression spring 113. The opening of the valve is effected by a rocking lever 114 working on a vertical pivot 114a fixed on the table 1. One end of the rocking lever 114 carries an adjustable abutment screw 115 fitted with a locking stop nut 116 and intended to work in conjunction with the rounded end of the valve-actuating pushrod 112. The other end of the lever 114 carries a similar adjustable abutment screw 117 fitted with a locking stop nut 118 and working in conjunction with the corresponding face of the collar 51 forming the means of attachment of the main supporting pillar 38, carrying the spray gun 24 and bar 48 which supports the stencil plate 41, on the horizontal rod 52. The arrangement is such that when the pillar 38 reaches the end of its travel in the direction of the work holder, it causes the valve 106 to open, by slightly tilting the lever 114 on its pivot 114a. When the pillar 38 returns, it frees the lever 114 and the valve 106 recloses by the action of its spring 113.

Furthermore, the stencil plate 41 (see Figs. 7, 8 and 10) is attached to the bar 48 by means of a ball joint 121 fitted on said bar and held between the spherical cup of a hub 122 attached to the stencil plate, and a similarly spherical boss on a locking ring 123 screwed in the hub 122 and widely recessed at 124 to enable the stencil plate assembly to be set obliquely with reference to the bar 48.

The upper edge of the stencil plate 41 is slightly curved to the rear, as represented in particular in Figs. 8 to 10. A mask 126, the corners of which are likewise curved, is attached to the part of the stencil plate facing the spray gun by means of bolts 127 and spacing washer 128 maintaining a predetermined clearance between the stencil plate and the mask. The bolts 127 pass through the mask in slotted holes 129 enabling the upper edge of the mask to be adjusted with reference to the upper edge of the stencil plate.

A small tube 131 set perpendicularly to the surface of the stencil plate passes through the same and ends in front of a small plate 132 forming part of the stencil plate assembly and attached at a short distance in front of the part of the stencil plate that is opposite the article to be decorated. The arrangement is such that compressed air introduced through this tube 131 expands to form a thin screen behind the stencil plate and improves the quality of the applied decoration. A trough 133 attached to the lower part of the stencil plate enables color retained thereon to be collected and recovered. A pipe 134 communicating with the trough 133 can be connected with a pipe leading to a suitable container in which the recovered color collects by gravity.

Fig. 11 shows diagrammatically the general arrangement of the machine, in which the principal elements already described will be seen. Mention should be made of a pipe 136 conveying compressed air from the distributor manifold 83 to the feed pipe 131 of the stencil plate 41; and a further pipe 137, conveying air into the color or paint tank 27 for the purpose of agitating and mixing the contents thereof. The feeder circuit of the electric motor 21 is controlled by a main switch 138.

Further, as will be seen in Fig. 7, an exhauster 139 is arranged within the range of action of the spray gun, beyond the stencil plate, for recovering color or paint which is not intercepted, either by the stencil plate itself, or by the article to be decorated. This paint recovery apparatus may be of any suitable, conventional type, and does not constitute a feature of the invention.

The manner of action of the described machine is as follows:

It is assumed that the compressed air distributor manifold 83 is under a pressure of e. g. 3 kg./cm.$^2$ and that the cocks of the pipes leading from it are open. The terminals 91 and 92 of the supply circuit of the electric valve are provided with an appropriate voltage. The switch 138 is closed to start the electric motor 21 and drive the two rollers 3, 4 supporting and rotating the article to be decorated, as well as the cam 99. As soon as this cam releases the mercury tripping switch 93, the latter drops and closes the supply circuit to the electric valve 77. The latter admits compressed air through the pipe 86 to the cylinder 56 whereupon the piston 58 is forced back against the spring 66. The drive shaft 52 integral with the piston 58 displaces the main supporting pillar 38 backwards and moves the spray gun 24 and the stencil plate 41 away from the platen 5. This is the intended instant for placing a plate or other object to be decorated on the two cylindrical rollers 3, 4 of the platen. Then driven by the rollers 3, 4 the object begins to spin regularly.

Next, the cam 99 raises the mercury tripping switch 93 which then interrupts the supply circuit of the electric valve 77. The valve then opens the cylinder 56, and the air it contains is exhausted by the piston 58 which is driven back by the spring 66, the air escaping by the pipe 86 and the blow off branch 81 of the electric valve. At the same time, the piston 58 carries with it the rod 52 and consequently the stencil plate 41 and the spray gun 24 approach the platen 5. At the end of the stroke, the stencil plate is directly adjacent to the object on the platen without touching it, however, and its upper rim lies below the upper rim of the object at a distance equal to the width of the thin strip or band of color to be applied to the work surface or rim of the object. When the rod 52 reaches the end of its stroke in this direction, the collar 51 strikes the abutment screw 117 of the trip lever 114 which, by its adjustable screw 115 moves the pushrod 112 of the compressed air admission valve 106 of the spray gun. The color is then sprayed on to the rim of the object while the latter continues to spin. After the object has made three complete turns, plus a partial turn, the cam 99 again releases the mercury tripping switch 93. Thereupon the electric valve 77 is opened and the piston 58 is driven back reversing the travel of the spray gun 24 and the stencil plate 41. The admission valve 106, released at the start of the reversing motion, immediately shuts off the supply of compressed air to the spray gun, which ceases to function.

During the brief period in which the stencil plate 41 is reversing, the object which has just been decorated is withdrawn and is replaced by a new object and the cycle is repeated.

Thus a very regular action is obtained both in regard to the width of the colored band and the depth of the color deposited and this not only over the whole circumference of one particular object, but equally uniformly on successive work pieces. The working conditions do not vary, the plates spin at a very uniform rate and the spraying time is constant. Moreover, output is far higher than in the case of manual operation. It is easily possible to decorate 500 pieces an hour, or about three times more than obtained by manual operation, i. e. by placing a stencil on the object with the left hand and spraying by means of a spray gun held in the right hand.

By way of example, a 7 seconds cycle can be adopted of which the operating time is 5 seconds and the reversing time 2 seconds.

It will be appreciated that with a machine as herein described, it is possible to decorate at will various types and sizes of plates, dishes, and other circular objects, and to deposit bands of any desired breadth or color on such objects.

Adjustment of the controls to the varying size of the work pieces is extremely simple; it is sufficient to adjust the position of the carrying rollers 3, 4 and of the stencil plate 41, and, if necessary, of the spray gun 24. The centering of the work pieces is accurately and quickly obtained simply by placing them on the rollers. The machine performs all the work, it being only necessary manually to put on and take off the workpieces.

It is equally possible to perform the decoration on unfired pieces (slip painting) or on fired pieces (decoration under or over glazing).

All the color not deposited on the objects is recovered; the color intercepted by the stencil plate flows into the trough 133, and the color intercepted neither by the stencil plate nor by the objects is collected by the exhauster 139.

The machine does not require the use of any special colorising agents; ordinary colors with a metal oxide base can be used, i. e. finely ground ceramic colors suspended in water.

It is to be noted that the masking means, including the plate 41 and mask 126, provide the sprayed area on the work surface with a clean, sharply defined edge and is adaptable to spraying apparatus generally. The spray is directed across the edges of the plate 41 and mask 126, and their profiles are quite close together and approximately in line with each other. Droplets of the liquid in the spray which might otherwise tend to collect upon and foul the edge of the plate 41 will, therefore, be intercepted by the edge of the mask 126, and will collect and run down the mask. In this way, the profile edge of the plate 41, which limits the area of the work surface 2 exposed to the spray, will be kept clean and free from drops of liquid, and one of the chief causes of a blurred edge to the sprayed area of the work surface is eliminated.

Moreover, the thin flat stream of air which issues from the space between the member 132 and the plate 41, travels across the rear face of the plate 41 in a plane parallel with the face, and in a direction towards that part of the edge of the plate 41 across which the spray is directed. Thus, the air stream impinges upon the spray immediately after it passes the edge of the plate 41. This action tends to concentrate the spray and eliminate any eddies deviating from the main stream at this point, and, therefore, another cause of a blurred edge to the sprayed area of the work surface is eliminated.

Finally it will be understood that the invention is not restricted to the embodiment described and illustrated and that modifications may be made within the scope of the appended claims. Thus, for example, it is possible to provide caps to cover and protect the fittings situated below the table and behind the platen carrying the rollers that support the work pieces.

I claim:

1. Apparatus for decorating plates and similar objects comprising, in combination, a device adapted to rotatably support the object to be decorated, a compressed air actuated spray gun directed towards said device, a stencil plate, a carrier movably supporting said stencil plate, means for moving said carrier to move said stencil plate to a working position in proximity to the object and in the spray path of said spray gun and to withdraw said stencil plate from the object to permit removal and replacement of the object, means for supplying compressed air to said spray gun when said stencil is in working position proximate the object, and means for synchronizing the operation of said compressed air supplying means with said object rotating means to rotate the object through at least one complete revolution during operation of said spray gun, said device including a platen freely rotatable about an axis inclined to the horizontal and two rotatable rollers adjacent said platen and adapted to support the rim of an object to be decorated with the bottom of said object resting against said platen, and a motor and means for transmitting rotation from said motor to said rollers.

2. Apparatus for decorating plates and similar circular objects comprising a device adapted to rotatably support the object to be decorated, and means for decorating the object as it is rotated on said device, said device including a freely rotatable platen journaled on an axis inclined to the horizontal and two rotatable rollers adjacent the periphery of said platen and adapted to support the rim of the object to be decorated with the bottom of the object resting against said platen, and means for transmitting rotation from said rotating means to said rollers.

3. Apparatus for decorating plates and similar objects comprising, in combination, a device adapted to rotatably support the object to be decorated, means for rotating said object on said device, a compressed air actuated spray gun directed towards said device, a stencil plate, a carrier movably supporting said stencil plate, means for moving said carrier to move said stencil plate to a working position in proximity to the object and in the spray path of said spray gun and to withdraw said stencil plate from the object to permit removal and replacement of the object, means for supplying compressed air to said spray gun when said stencil is in working position proximate the object, and means for synchronizing operation of said compressed air supplying means with said object rotating means to rotate the object through at least one complete revolution during operation of said spray gun, said carrier moving means including a horizontal cylinder, a piston slidable in said cylinder and connected to said carrier, a conduit for supplying fluid under pressure to said cylinder, an electrically actuated valve mounted in said conduit, a switch controlling actuation of said valve, and a rotating cam for operating said switch for actuating said electrically actuated valve.

4. Apparatus according to claim 3 comprising means for rotating said cam by said means for rotating the object on said device.

5. Apparatus for decorating plates and similar objects comprising, in combination, a device adapted to rotatably support the object to be decorated, means for rotating said object on said device, a compressed air actuated spray gun directed towards said device, a stencil plate, a carrier movably supporting said stencil plate, means for moving said carrier to move said stencil plate to a working position in proximity to the object and in the spray path of said spray gun and to withdraw said stencil plate from the object to permit removal and replacement of the object, means for supplying compressed air to said spray gun when said stencil is in working position proximate the object, and means for synchronizing operation of said compressed air supplying means with said object rotating means to rotate the object through at least one complete revolution during operation of said spray gun, said means for supplying compressed air to said spray gun including a normally closed valve, means including a valve control member for opening said valve, and means on said carrier and engageable with said valve control member when said stencil plate is in working position proximate said object to open said valve.

6. Apparatus for decorating plates and similar objects comprising, in combination, a device adapted to rotatably support the object to be decorated, means for rotating said object on said device, a compressed air actuated spray gun directed towards said device, a stencil plate, a carrier movably supporting said stencil plate, means for moving said carrier to move said stencil plate to a working position in proximity to the object and in the spray path of said spray gun and to withdraw said stencil plate from the object to permit removal and replacement of the object, means for supplying compressed air to said spray gun when said stencil is in working position proximate the object, means for synchronizing operation of said compressed air supplying means with said object rotating means to rotate the object through at least one complete revolution during operation of said spray gun, and a mask adjustably mounted in front of said stencil plate, in parallel, closely spaced relation to said stencil plate and defining a drain passage therebetween, said stencil plate and mask having spray intercepting edges of like configuration and aligned with the spray path.

7. Apparatus for decorating plates and similar objects comprising, in combination, a device adapted to rotatably support the object to be decorated, means for rotating said object on said device, a compressed air actuated spray gun directed towards said device, a stencil plate, a carrier movably supporting said stencil plate, means for moving said carrier to move said stencil plate to a working position in proximity to the object and in the spray path of said spray gun and to withdraw said stencil plate from the object to permit removal and replacement of the object, means for supplying compressed air to said spray gun when said stencil is in working position proximate the object, means for synchronizing operation of said compressed air supplying means with said object rotating means to rotate the object through at least one complete revolution during operation of said spray gun, said stencil plate having a spray intercepting edge, a shield mounted on the rear face of said stencil plate and forming a narrow passage therebetween and opening toward said spray intercepting edge, and means for supplying air under pressure into said passage and directed through said opening past said spray intercepting edge.

8. Apparatus according to claim 7, comprising a mask adjustably mounted in front of said stencil plate, in parallel, closely spaced relation to said stencil plate and defining a drain passage therebetween, said stencil plate and mask having spray intercepting edges of like configuration and aligned with the spray path.

9. Masking apparatus for use with spraying apparatus for decorating a work surface and sharply defining the edge to the area sprayed on the work surface, comprising a plate having an upper stencil forming edge to be disposed in the spray path to intercept a portion of the spray, said plate being positioned at an angle to the horizontal for draining the intercepted spray, said stencil forming edge having a definite profile across which the spray travels, a mask having a similar profile, means supporting said mask on the side of said plate facing the spray and spaced from said plate with the profile of the mask in close proximity to the profile of the plate with a narrow space between the plate and mask for draining intercepted spray down said plate.

10. Apparatus as set forth in claim 9, including a shield mounted on the rear side of the plate in spaced relation and defining a narrow upwardly opening nozzle, and means for directing a stream of compressed air between said shield and plate to produce a thin air screen from said nozzle and passing upwardly past said plate profile to improve the quality of the applied decoration.

11. The device set forth in claim 9, including an adjustable support pivotally and removably attached to substantially the central portion of the plate.

12. Masking apparatus for use with a spraying apparatus for decorating a work surface and sharply defining the edge to the area sprayed on the work surface, comprising a stencil plate having an upper stencil forming edge to be disposed in the spray path to intercept a portion of the spray, said plate being positioned at an angle to the horizontal for draining the intercepted spray, said stencil forming edge having a definite profile across which the spray travels, and a shield mounted on the rear side of the plate in spaced relation and defining a narrow upwardly opening nozzle, and means for directing a stream of compressed air between said shield and plate to produce a thin air screen from said nozzle and passing upwardly past said plate profile to improve the quality of the applied decoration.

References Cited in the file of this patent
UNITED STATES PATENTS

| | | |
|---|---|---|
| 1,696,202 | Harris | Dec. 25, 1928 |
| 2,189,783 | Eberhart | Feb. 13, 1940 |
| 2,342,375 | Shurley | Feb. 22, 1944 |
| 2,645,200 | Schweitzer | July 14, 1953 |
| 2,693,785 | West | Nov. 9, 1954 |